United States Patent [19]
Wallach

[11] 3,947,975
[45] Apr. 6, 1976

[54] EDUCATIONAL TESTING AND TRAINING DEVICE

[76] Inventor: Ira Wallach, Club Marina Costa D'n Blaines, Mallorca, Spain

[22] Filed: July 5, 1974

[21] Appl. No.: 486,133

[52] U.S. Cl. ............ 35/22 R; 35/48 R; 273/130 AB
[51] Int. Cl.[2] .......................................... G09B 19/00
[58] Field of Search ...... 35/6, 8 R, 9 R, 22 R, 35 R, 35/35 D, 48 R, 2, 4; 128/2 N; 273/1 E, 130 AB; 283/17; 340/279

[56] References Cited
UNITED STATES PATENTS

| | | | |
|---|---|---|---|
| 3,024,020 | 3/1962 | Alton | 35/22 R X |
| 3,346,968 | 10/1967 | Dellinger | 35/6 |
| 3,641,686 | 2/1972 | Krass | 35/22 R |
| 3,698,385 | 10/1972 | Low et al. | 35/22 R X |

Primary Examiner—Richard C. Pinkham
Assistant Examiner—Vance Y. Hum
Attorney, Agent, or Firm—Wolder & Gross

[57] ABSTRACT

A device for testing and improving manual and mental dexterity includes a series of lamps and switches finger transferrable between open and closed states. A network interconnects the switches and lamps with a current source, so that the actuation of the switches in a predetermined sequence to closed and opened states within a predetermined time energizes all the lamps and maintains them energized. The network includes first and third similar transistors and a third transistor of opposite type. The base of the first transistor is connected by a capacitor to the junction of a switch and lamp series connected across the voltage supply, the collector of the second transistor is grounded through a large capacitor and the base of the third transistor is connected through a capacitor and resistor to its emitter by way of one of the switches.

7 Claims, 2 Drawing Figures

EDUCATIONAL TESTING AND TRAINING DEVICE

BACKGROUND OF THE INVENTION

The present invention relates generally to improvements in electrical educational devices, and it relates more particularly to an improved electronic educational device for testing and improving mental and manual dexterity.

It has been a long and common practice to test and develop the manual and mental dexterity of an individual and many procedures and apparatus have been employed and proposed to this end. However, the devices and apparatus heretofore employed and available possess numerous drawbacks and disadvantages. They are frequently crude and primitive devices of limited or no effectiveness, are often expensive and highly complex and bulky and of little reliability, and have been of little versatility and adaptability.

SUMMARY OF THE INVENTION

It is a principal object of the present invention to provide an improved educational testing and training device.

Another object of the present invention is to provide an improved electronic device for testing and developing mental and manual dexterity, as well as amusement and entertainment.

Still another object of the present invention is to provide an improved electronic device testing the learning and manual coordination of an individual and for developing such coordination.

A further object of the present invention is to provide a device of the above nature characterized by its reliability, simplicity, compactness, low cost, ease of use and application and great versatility and adaptability.

The above and other objects of the present invention will become apparent from a reading of the following description taken in conjunction with the accompanying drawings, which illustrate preferred embodiments thereof.

In a sense, the present invention contemplates the provision of a coded type of educational device comprising at least three switches independently selectively transferrable between open and closed states, and a corresponding number of electrical signal members and circuit means responsive to the transfer of the switches to predetermined opened and closed states in a predetermined sequence within a predetermined time interval for actuating the signal members and maintaining them in their actuated state.

In its preferred form, the signal members are lamps or light emitting diodes (LED) and the circuit means includes a voltage source with opposite first and second poles, a pair of first and third transistors of a first type and a second transistor of an opposite type. A first switch and lamp are series connected between the voltage poles, a second switch and lamp are series connected between the poles and a third lamp is connected between the second transistor collector and the first pole. A second capacitor and a third switch are connected in series between the second transistor collector and the second pole, a first capacitor connects the first transistor base to the junction of the first lamp and switch, means connect the first transistor collector to the second transistor base and the second transistor emitter to the second pole. A fourth lamp and switch are series connected between the poles and a capacitor and resistor connected in series connect the third transistor base to the fourth lamp and switch junction and a resistor connects the third transistor collector to the second transistor base. The third transistor emitter is connected to the first pole and the base is connected through a resistor to the junction of the third switch and second capacitor.

The improved device is simple, rugged and reliable, of great effectiveness, versatility and reliability.

DESCRIPTION OF THE PREFERRED EMBODIMENTS

Figure 1:
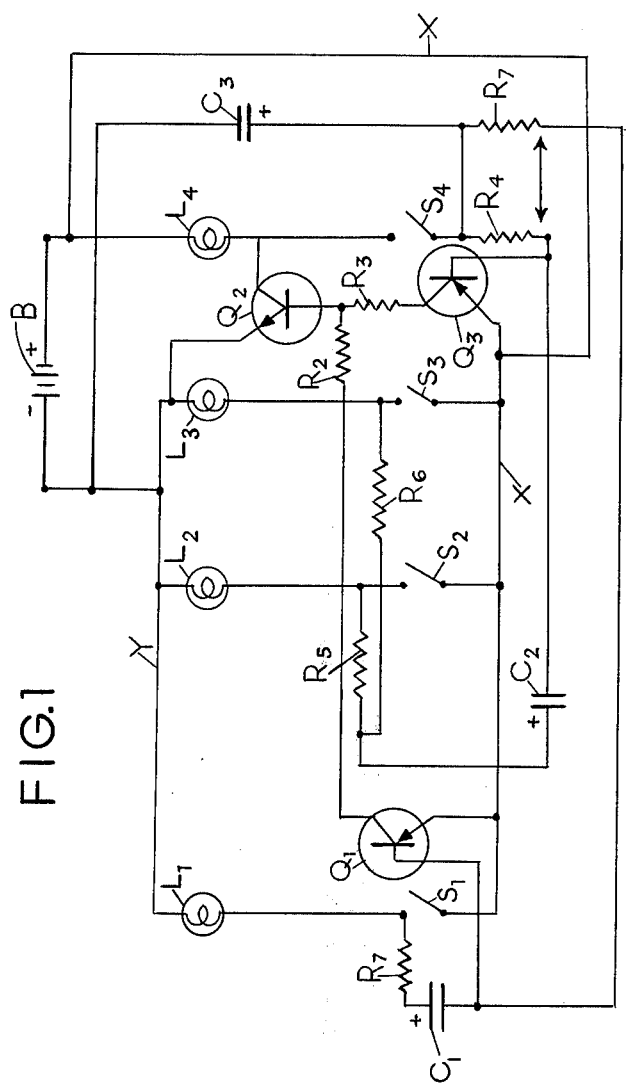
FIG. 1 is a circuit diagram of a network embodying the present invention.

Referring now to the drawings, particularly FIG. 1 thereof which illustrate a preferred embodiment of the present invention, the reference numerals $S_1$, $S_2$, $S_3$ and $S_4$ generally designate finger operable switches which are selectively transferrable between open and closed conditions, and each switch has associated therewith a respective incandescent low voltage lamp $L_1$, $L_2$, $L_3$ and $L_4$, for example, grain of wheat lamps. The network is suitably housed and the switches are so located as to be easily and rapidly individually finger operated and the lamps readily visible. Moreover, while four sets of switches and lamps are shown, it should be understood that as little as three and more than four, may be employed. A small battery B, for example of 3 to 6 volts, is replaceably carried by the housing, the positive pole being connected to line $x$ and the negative pole being connected to line $y$.

The switch $S_1$ and lamp $L_1$ are series connected between lines $x$ and $y$ and the junction point thereof is connected through a resistor R, and a capacitor $C_1$ to the base of a PNP transistor $Q_1$, the emitter of which is connected to line $x$ and the collector of which is connected through a resistor $R_2$ to the base of a NPN transistor $Q_2$. The emitter of transistor $Q_2$ is connected to line $y$, its collector is connected to the junction point of lamp $L_4$ and switch $S_4$ which are series connected and its base is connected through a resistor $R_3$ to the collector of a PNP transistor $Q_3$.

The emitter of transistor $Q_3$ is connected to line $x$ and its base is connected through a resistor $R_4$, switch $S_4$ and lamp $L_4$ in series to line $x$. The lamp $L_2$ and switch $S_2$ are series connected between lines $x$ and $y$ and their junction point is connected through a resistor $R_5$ and a capacitor $C_2$ in series to the base of transistor $Q_3$. The junction of resistor $R_5$ and capacitor $C_2$ is connected through a resistor $R_6$ to the junction of lamp $L_3$ and switch $S_3$ which are series connected between lines $x$ and $y$. The base of transistor $Q_1$ is connected through a resistor $R_7$ and a capacitor $C_3$ in series to line Y, the junction of capacitor $C_3$ and resistor $R_7$ being connected to the junction of switch $S_4$ and resistor $R_4$.

The following are the specific values of the components of the network and are given merely by way of example:

$C_1$, $C_2$ — 0.22 mfd
$C_3$ — 10 mfd
$Q_1$, $Q_3$ — HEP 52
$Q_2$ — S 3023
$R_1$, $R_5$, $R_6$ — 110
$R_2$ — 820 $\Omega$ $R_3$ — 220 Ω

$R_4$, $R_7$ — 6.8 K Ω

In the operation of the network described above, starting with all the switches in their open state, it is necessary to actuate or manipulate the switches in a predetermined sequence within a short predetermined interval, for example, a second, although this interval may be increased or decreased if desired by adjusting the parameters of the current, in order to energize all of the lamps and maintain them in their energized state. This result is not achieved if the proper switch actuating sequence is not effected within the specified time. Specifically, the proper switch actuating sequence in the present network with all the switches being initially open is successively to close switch $S_1$, close switch $S_2$, close switch $S_3$, open switch $S_2$, close switch $S_4$, open switch $S_1$, close switch $S_1$ and close switch $S_2$.

Figure 2:
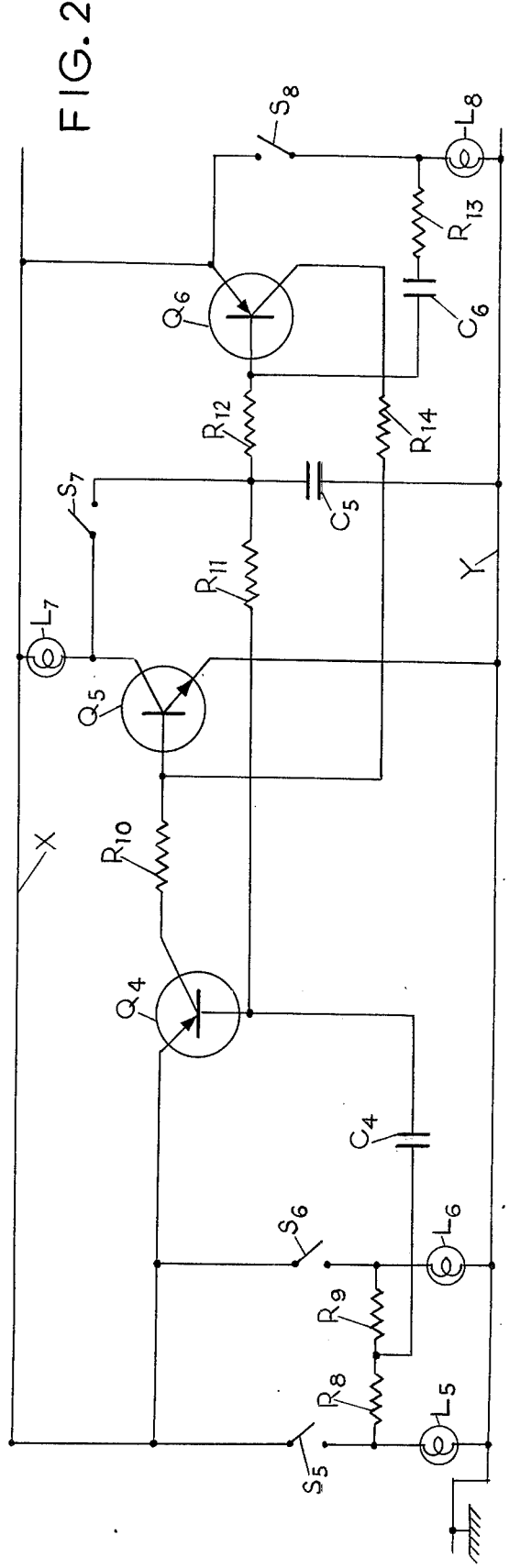
FIG. 2 is a circuit diagram of another embodiment thereof.

In FIG. 2 of the drawing there is shown another form of the present network which, like that first described, employs four pairs of lamps and switches and a battery whose positive and negative terminals are connected to lines $x$ and $y$ respectively. A switch $S_5$ and a lamp $L_5$ are connected in series between lines $x$ and $y$ and a switch $S_6$ and a lamp $L_6$ are connected in series between lines $x$ and $y$ and the junction of lamp $L_5$ and switch $S_5$ is connected by resistors $R_8$ and $R_9$ in series to the junction of switch $S_6$ and lamp $L_6$. The junction of resistors $R_8$ and $R_9$ is connected through a capacitor $C_4$ to the base of a PNP transistor $Q_4$ whose emitter is connected to line $x$ and whose collector is connected through a resistor $R_{10}$ to the base of a NPN transistor $Q_5$. The base of transistor $Q_4$ is also connected through resistors $R_{11}$ and $R_{12}$ in series to the base of a PNP transistor $Q_6$.

The collector of transistor $Q_5$ is connected through a lamp $L_7$ to line $x$ and through a switch $S_7$ and a capacitor $C_5$ in series to line Y and the emitter of transistor $Q_5$ is connected to line $y$. The junctions of switch $S_7$ and capacitor $C_5$ and of resistors $R_{11}$ and $R_{12}$ are connected. The emitter of transistor $Q_6$ is connected to line $x$ and is connected to line $y$ through a switch $S_8$ and a lamp $L_8$ in series. The junction of switch $S_8$ and lamp $L_8$ is connected through a resistor $R_{13}$ and a capacitor $C_6$ to the base of transistor $Q_6$ and the collector of transistor $Q_6$ is connected through a resistor $R_{14}$ to the base of transistor $Q_5$.

In accordance with an example of the network of FIG. 2 the components possess the following values:

$C_4$, $C_6$ — 0.22

$C_5$ — 10 $\mu f$ $Q_4$, $Q_6$ — HEP 52

$Q_5$ — S 3023

$R_8$, $R_9$, $R_{13}$ — 110 Ω

$R_{10}$, $R_{14}$ — 830 Ω

$R_{11}$, $R_{12}$ — 6.8 k Ω

The operation of the network last described is similar to that first described. It should be noted that a three switch device may be produced by omitting from the network of FIG. 2 the transistor $Q_6$, switch $S_8$, lamp $L_8$, capacitor $C_6$ and resistors $R_{12}$, $R_{13}$ and $R_{14}$. The switches $S_5$–$S_8$ are, like switches $S_1$–$S_4$ of the single pole single throw type.

It is also possible to use any numbers of switches and circuits, and to include temperature and light sensing devices.

While there have been described and illustrated preferred embodiments of the present invention, it is apparent that numerous alterations, omissions and additions may be made without departing from the spirit thereof.

I claim:

1. A coded device comprising a plurality of at least three switch means independently selectively transferrable between open and closed states, a plurality of at least three electrically actuatable signal members, time interval means for providing a predetermined time interval, circuit means electrically connected to said switch means and time interval means for actuating said signal members in their actuated condition upon transfer of said three switch means to predetermined opened and closed states during said predetermined time interval, and the arrangement of said circuit means being such that at least one of said switch means must be at least twice transferred to opposite states in order to maintain said signal members in said actuated condition.

2. The device of claim 1 wherein said signal members are lamps.

3. A coded device comprising at least three switches independently selectively transferrable between open and closed states, a plurality of at least three electrically actuatable lamps, and circuit means responsive to the transfer of said switches to predetermined opened and closed states in a predetermined sequence within a predetermined time interval for actuating said lamps and maintaining said lamps in their actuated condition, said circuit means comprising a source of current including opposite first and second poles, a pair of first and second transistors of opposite types, a first of said switches and lamps connected in series between said poles, a second of said switches and lamps connected in series between said poles, a third of said lamps connected between the collector of said second transistor and said first pole, an second capacitor and a third of said switches connected in series between said second transistor collector and said second pole, means including a first capacitor connecting the base of said first transistor between said first lamp and said first switch, means connecting the emitter of said first transistor to said first pole, means connecting the collector of said first transistor to the base of said second transistor and means connecting the emitter of said second transistor to said second pole.

4. The device of claim 3 wherein a fourth of said switches and lamps are connected in series between said poles and comprising a third transistor of the same type as said first transistor, means including a capacitor and resistor in series connecting the base of said third transistor to the junction of said fourth lamp and switch, means including a resistor connecting the collector of said third transistor to the base of said second transistor, means connecting the emitter of said third transistor to said first pole and means including a resistor connecting the base of said third transistor to the junction of said third switch and second capacitor.

5. The device of claim 4 wherein said second capacitor is of greater capacitance than said first and third capacitors.

6. The device of claim 3 including a tapped resistance member connecting the junctions of said first switch and lamp and said second switch and lamp, said first capacitor being connected to said tapped resistance member between the ends thereof.

7. The device of claim 3 wherein said second capacitor is of greater capacitance than said first capacitor.

* * * * *